United States Patent
Opshaug

(10) Patent No.: US 11,904,985 B2
(45) Date of Patent: *Feb. 20, 2024

(54) DETECTION OF DERELICT FISHING GEAR

(71) Applicant: Blue Ocean Gear LLC, Redwood City, CA (US)

(72) Inventor: Kortney Noell Opshaug, Redwood City, CA (US)

(73) Assignee: Blue Ocean Gear LLC, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,264

(22) Filed: Jun. 20, 2022

(65) Prior Publication Data

US 2022/0315170 A1 Oct. 6, 2022

Related U.S. Application Data

(63) Continuation of application No. 16/848,076, filed on Apr. 14, 2020, now Pat. No. 11,390,360, which is a
(Continued)

(51) Int. Cl.
*B63B 22/18* (2006.01)
*A01K 75/00* (2006.01)
(Continued)

(52) U.S. Cl.
CPC .............. *B63B 22/18* (2013.01); *A01K 75/00* (2013.01); *A01K 97/125* (2013.01); *G01S 19/14* (2013.01);
(Continued)

(58) Field of Classification Search
CPC ... B63B 22/18; B63B 22/08; B63B 2022/006; B63B 2213/02; A01K 75/00;
(Continued)

(56) References Cited

U.S. PATENT DOCUMENTS

| 5,782,033 A | 7/1998 | Park et al. |
| 6,256,264 B1 * | 7/2001 | Beckman ................ G01S 15/66 367/130 |

(Continued)

FOREIGN PATENT DOCUMENTS

| WO | 2017112778 A1 | 6/2017 |
| WO | 2017120457 A1 | 7/2017 |

OTHER PUBLICATIONS

"Speciality Products for Fish and Shellfish Pots and Traps." Neptune Marine Products. Web. Retrieved Apr. 21, 2016. http://neptunemarineproducts.com/.

(Continued)

*Primary Examiner* — Hussein Elchanti
(74) *Attorney, Agent, or Firm* — Lempia Summerfield Katz LLC

(57) ABSTRACT

The location of lost or entangled fishing gear, known as derelict gear, is detected. The motion or change of position of a buoy attached to fishing gear is determined via sensors mounted on the buoy and compared to typical buoy motion. If the buoy has moved beyond a threshold value from its original location, an alert is sent to the fisherman. The available sensor data will be used to determine the likelihood of loss or entanglement. This alert facilitates recovery of lost or entangled gear by identifying where immediate retrieval efforts should be focused. The number of traps lost to the ocean that otherwise would continue to trap or entangle marine life may be reduced.

25 Claims, 15 Drawing Sheets

Related U.S. Application Data continuation of application No. 15/882,002, filed on Jan. 29, 2018, now Pat. No. 10,654,544.

(60) Provisional application No. 62/463,002, filed on Feb. 24, 2017.

(51) Int. Cl.

| | | |
|---|---|---|
| *A01K 97/12* | (2006.01) | |
| *G01S 19/35* | (2010.01) | |
| *G01S 19/14* | (2010.01) | |
| *B63B 22/00* | (2006.01) | |
| *G10K 11/00* | (2006.01) | |
| *B63B 22/08* | (2006.01) | |

(52) U.S. Cl.
CPC ............... *G01S 19/35* (2013.01); *B63B 22/08* (2013.01); *B63B 2022/006* (2013.01); *B63B 2213/02* (2013.01); *G10K 11/006* (2013.01)

(58) Field of Classification Search
CPC ....... A01K 97/125; G01S 19/35; G01S 19/14; G10K 11/006
See application file for complete search history.

(56) References Cited

U.S. PATENT DOCUMENTS

| | | | | |
|---|---|---|---|---|
| 8,086,408 B1* | 12/2011 | Majzlik | ................ | G01V 1/3835 |
| | | | | 702/14 |
| 8,553,501 B1* | 10/2013 | Cota | ....................... | A01K 69/00 |
| | | | | 43/100 |
| 8,643,544 B2 | 2/2014 | Taylor | | |
| 8,651,057 B1 | 2/2014 | Welsh | | |
| 8,775,070 B1 | 7/2014 | Bhatia | | |
| 8,881,682 B2 | 11/2014 | Thorvardarson | | |
| 8,919,034 B2 | 12/2014 | Alhuwaishel | | |
| 9,091,550 B1 | 7/2015 | Smith | | |
| 9,563,203 B2 | 2/2017 | Davoodi | | |
| 9,705,607 B2* | 7/2017 | Dugan | ................ | A01K 29/005 |
| 9,809,281 B2 | 11/2017 | Welch | | |
| 9,814,226 B2 | 11/2017 | Opshaug | | |
| 9,834,283 B2 | 12/2017 | Adams | | |
| 10,654,544 B2* | 5/2020 | Opshaug | .............. | A01K 97/125 |
| 11,390,360 B2* | 7/2022 | Opshaug | ................ | A01K 75/00 |
| 2003/0061978 A1 | 4/2003 | Myers, Jr. | | |
| 2008/0016749 A1 | 1/2008 | Priednieks | | |
| 2010/0143038 A1* | 6/2010 | Cobb | ................. | E02B 15/0814 |
| | | | | 405/63 |
| 2011/0000417 A1 | 1/2011 | Jone et al. | | |
| 2011/0018275 A1* | 1/2011 | Sidenmark | .......... | F03B 13/1815 |
| | | | | 290/53 |
| 2012/0316769 A1* | 12/2012 | Gagliardi | .............. | B63B 35/086 |
| | | | | 701/300 |
| 2013/0109259 A1 | 5/2013 | Abulrassoul et al. | | |
| 2013/0155806 A1* | 6/2013 | Brizard | ................ | G01V 1/3817 |
| | | | | 367/16 |
| 2013/0167428 A1 | 7/2013 | Alhuwaishel | | |
| 2015/0156998 A1 | 6/2015 | Terry | | |
| 2016/0018377 A1* | 1/2016 | Corbett | .............. | G01N 33/1886 |
| | | | | 901/1 |
| 2016/0306059 A1* | 10/2016 | Davies | ................. | G01V 1/3843 |
| 2016/0309692 A1 | 10/2016 | Opshaug | | |
| 2016/0353725 A1 | 12/2016 | Worley, III | | |
| 2018/0244354 A1 | 8/2018 | Opshaug | | |
| 2019/0351978 A1* | 11/2019 | Biousse | ................. | B63B 22/14 |

OTHER PUBLICATIONS

European Search Report for European Application No. 19743334.5-1005 dated Sep. 24, 2021.

PCT International Search Report and Written Opinion of International Searching Authority dated Apr. 12, 2019, corresponding to PCT International Application No. PCT/US2019/014916.

* cited by examiner

DETECTION OF DERELICT FISHING GEAR

RELATED APPLICATIONS

The present patent document is a continuation of U.S. patent application Ser. No. 16/848,076, filed Apr. 14, 2020, which is a continuation of U.S. patent application Ser. No. 15/882,002, filed Jan. 29, 2018, which claims the benefit of the filing date under 35 U.S.C. § 119(e) of Provisional U.S. Patent Application Ser. No. 62/463,002, filed Feb. 24, 2017, which are hereby incorporated by reference.

BACKGROUND

Fishermen who use traps to catch their target species, such as crab or lobster, typically set their traps out for more than a day. Buoys are attached to the traps via a length of rope to facilitate retrieval for harvest at a later date, either a single trap per buoy, or multiple traps with one or more buoys. However, during the time that the traps are unattended, fisherman can lose their traps due to a variety of reasons. Trap fishing gear can be washed away by inclement weather conditions, abandoned, entangled by marine mammals, dragged under by current, stuck in sediment, or severed by vessel propellers. It is estimated that crab and lobster fishermen around the world often lose between 10-30% of their traps each season. Whether or not buoys remain attached to the trap via the buoy line may depend on how the trap became lost to the ocean environment. Over time, derelict trap fishing gear can have a potentially negative impact on the ocean environment and marine life. Derelict pots may continue to capture animals without being harvested, known as ghost fishing, which can decimate a fishery's stocks. Lost traps can damage the ocean floor, and buoys with lines attached may entangle a marine mammal, boat propeller, or other fishing gear. The longer derelict gear are left out at sea, the greater the potential damage.

Search, location, and retrieval methods for lost trap fishing gear are currently handled in a variety of ways. Buoys can be surveyed from the air or reported by other boats in the vicinity. Side-scan sonar or remotely operated vehicles are often used to conduct surveys of large areas prior to or in conjunction with retrieval efforts. These methods are both costly and time consuming, and most traps are found by chance over a large area. To disentangle a whale from fishing gear, special methods, skills, and equipment are required. When a whale is seen entangled in gear, it is often not sighted again, preventing rescue efforts from occurring.

SUMMARY

By way of introduction, the preferred embodiments described below include methods, systems, instructions, and computer readable media for detecting lost or entangled fishing gear. The derelict gear is located more quickly, more accurately, and in a more cost-effective manner the ways discussed above. The location of a buoy is monitored to detect whether or not the buoy is derelict. The likelihood of the buoy being derelict may be determined. Determining the type of loss event (for example, entanglement with a marine mammal) based on motion of the buoy may allow the necessary resources to be mobilized in time to provide rescue efforts.

In a first aspect, a system is provided for detecting lost or entangled fishing gear. A sensor is on a buoy for attaching to fishing gear. A detector is configured to determine, based on output of the sensor of the buoy, when the buoy has become lost or entangled. A transmitter is configured to send the output or to send an alert indicating that the buoy has become lost or entangled.

In a second aspect, a method of determining when fishing gear has undergone a loss or entanglement event is provided. An original position of a buoy is determined. Periodically, a current position of the buoy is determined. Periodically, a distance of the current position from the original position or a previous one of the current positions is compared to a threshold value. A velocity of the buoy is compared to a threshold value related to the expected motion of a loss or entanglement event. A likelihood of a loss or entanglement event for the buoy is determined based on the comparison of the distance and/or the comparison of the velocity.

In a third aspect, a method of determining when fishing gear has undergone a loss or entanglement event is provided. A sensor on a buoy determines a first position of the buoy when deployed. Position data for a second position of the buoy is received. A distance between the first position to the second position is determined with the position data. An alert is sent to a remote receiver when the distance is above a threshold.

In a fourth aspect, a system is provided for detecting lost or entangled fishing gear. A receiver is configured to receive sensor data or an alert from a buoy originally attached to fishing gear. A processor is configured to determine that the buoy is lost or entangled from the sensor data or the alert. A display is configured to display a warning based on the determination of the buoy being lost or entangled.

The present invention is defined by the following claims, and nothing in this section should be taken as a limitation on those claims. Further aspects and advantages of the invention are discussed below in conjunction with the preferred embodiments and may be later claimed independently or in combination.

DESCRIPTION OF FIGURES

The components and the figures are not necessarily to scale, emphasis instead being placed upon illustrating the principles of the invention. Moreover, in the figures, like reference numerals designate corresponding parts throughout the different views.

DETAILED DESCRIPTION OF INVENTION

Figure 1:
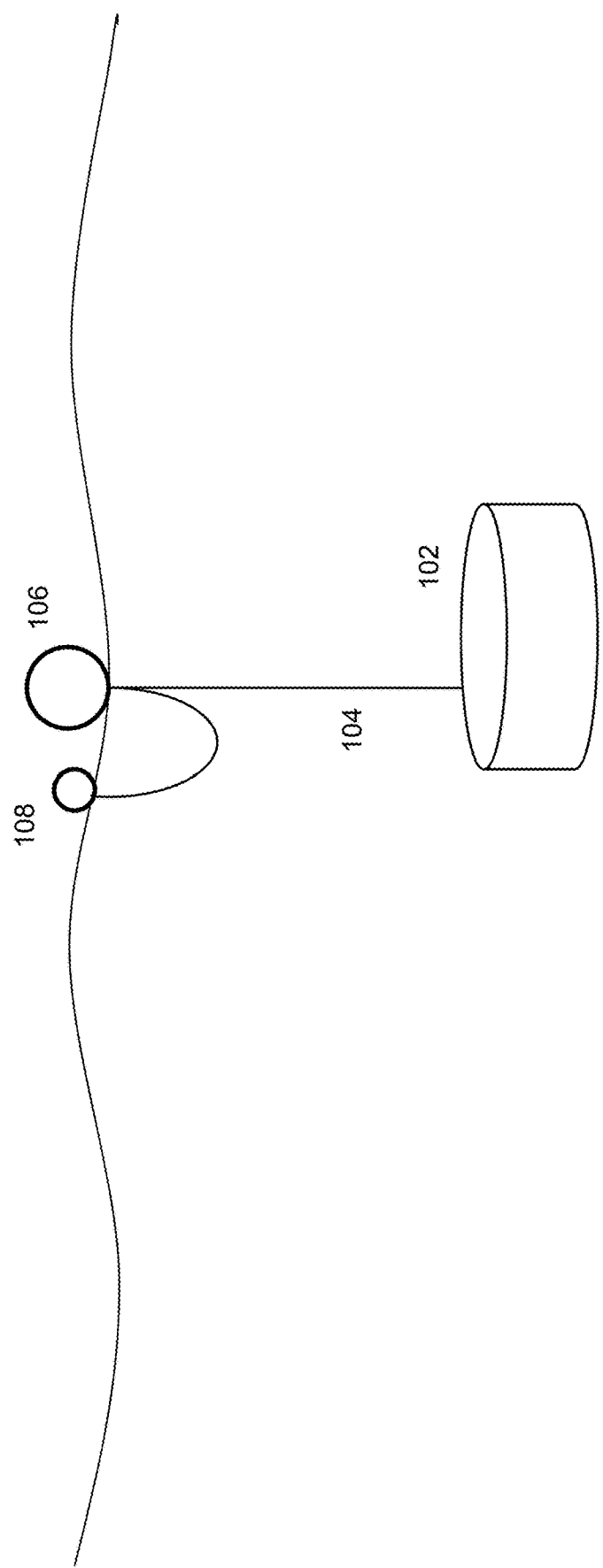
FIG. 1 illustrates one example of crab gear configuration.

A buoy is to be used on crab, lobster, or other fishing traps. The number and/or nature of interactions with marine mammals may be reduced by locating traps as soon as possible after the traps are lost or entangled. The type of loss event may be identified, facilitating retrieval and reducing the time a trap is compromised.

Due to regular monitoring of the buoy location and/or motion, an alert is sent to the fisherman when the buoy has moved farther than normal, has a different velocity than normal, or has a different acceleration than normal. The location, velocity, and/or acceleration may be due to a mammal entanglement, wandering due to inadequate gear setting, or a buoy line that has been severed and no longer has the trap as a stable anchor. Detecting these events allows for a quick-response short survey to facilitate immediate retrieval, before the trap can do much damage as a ghost fishing trap. The time to locate a trap may be reduced by communicating the position and/or motion immediately after an event has occurred or at another time.

Some embodiments include location, processing, and communications components mounted on a buoy associated with a crab or lobster fishing trap, along with a user interface to display the relevant information to the fisherman. The buoy can be a standard trap buoy used by fishermen, or a trailer buoy attached by a short rope to the trap buoy. The location components are a global navigation satellite system antenna and receiver for determining time, location, velocity, and/or acceleration. A microprocessor, controller, or other computer on the buoy processes the data from the location components to determine the original location of the buoy at the start of deployment, the location over time to determine how far the buoy has moved, and/or the associated speed and heading to determine how fast and in which direction the buoy is moving. The communications components send the processed data via cellular, satellite, radio, or other transmission to the fisherman. The fisherman may receive the data while onshore or in the boat. The electronics components are enclosed in a depth-rated enclosure and mounted on or in the buoy.

The user interface for this device periodically updates the location information of the buoy for the fisherman. Alternatively, the update is triggered, such as by detection of an event, receipt of data from a buoy, and/or activation by the fisherman. The period of update can be set to a given interval prior to deployment, or requested by the fisherman at any point in time. In one embodiment, if the buoy has moved beyond a distance typical of the range of motion for a trap buoy, an alert is output to the fisherman advising that the gear has moved, and that retrieval should begin at the last known location. In addition, the speed and heading may be displayed and analyzed so that the type of event causing the gear to move can be determined and/or to better route the boat for retrieval. This can help fishermen prepare for the various scenarios appropriately, prior to leaving for the retrieval efforts.

For the purposes of explaining the embodiments, crab trap configurations will be used. Embodiments can also be applied to any fishing gear that is set in the water over a period of time. This includes crab, lobster, shrimp, prawns, shellfish, and fish traps, or set fishing nets. The concepts can also be extended to other fisheries that have similar bycatch issues. Since the data regarding location and timing can be logged over time, the results can also be used to inform fisheries management best practices to avoid entanglements.

Crab fishermen typically set their traps as a single trap with a single buoy attached. For certain situations, such as to mark the start of a set of traps in one area, a second buoy will be attached to the first by a short rope; this is referred to as a trailer buoy. FIG. 1 shows an example setup with a trap (102) connected by a rope (104) to a buoy (106). A trailer buoy (108) is shown attached to the main trap buoys. The traps may be set as a string of traps. Multiple traps (102) connect by ropes (104). Buoys (106) are attached to this string of traps at either end. Trailer buoys (108) are shown attached to the main trap buoys.

Figure 2:
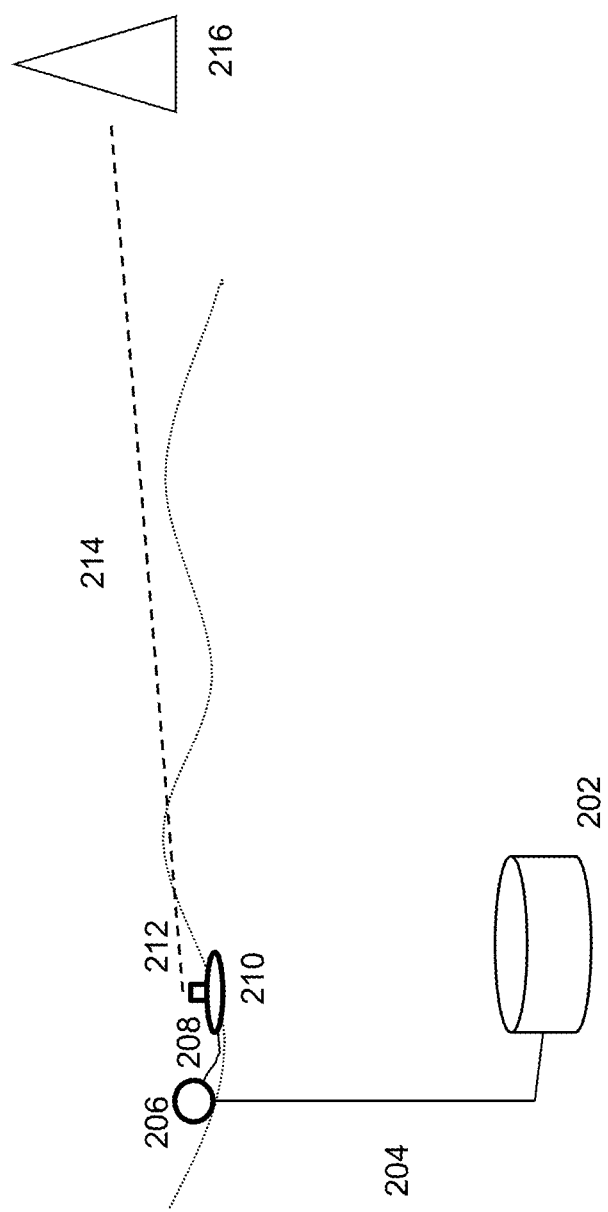
FIG. 2 illustrates one embodiment of the trap and buoy system.

FIG. 2 shows an embodiment of the trap and buoy communication system. A crab trap (202) is set on the ocean floor. A rope (204) connects the trap to the main trap buoy (206), floating on the ocean surface. A short rope (208) connects the main buoy to the trailer buoy (210) with a depth-rated, water-tight electronics enclosure mounted on top (212), within, or other location. The dashed line (214) represents the transmission signal to the land-based receiver (216).

In another embodiment, the electronics enclosure is mounted directly on the crab or lobster trap buoy (206), with or without a trailer buoy (210). In another embodiment, the battery pack is mounted as a counter balance on the bottom of the buoy (206, 210) to maintain the uprightness in calm conditions for improved transmitting. In another embodiment, the electronics enclosure is a water-tight housing that surrounds the electronics with no air-filled areas inside.

Figure 3:
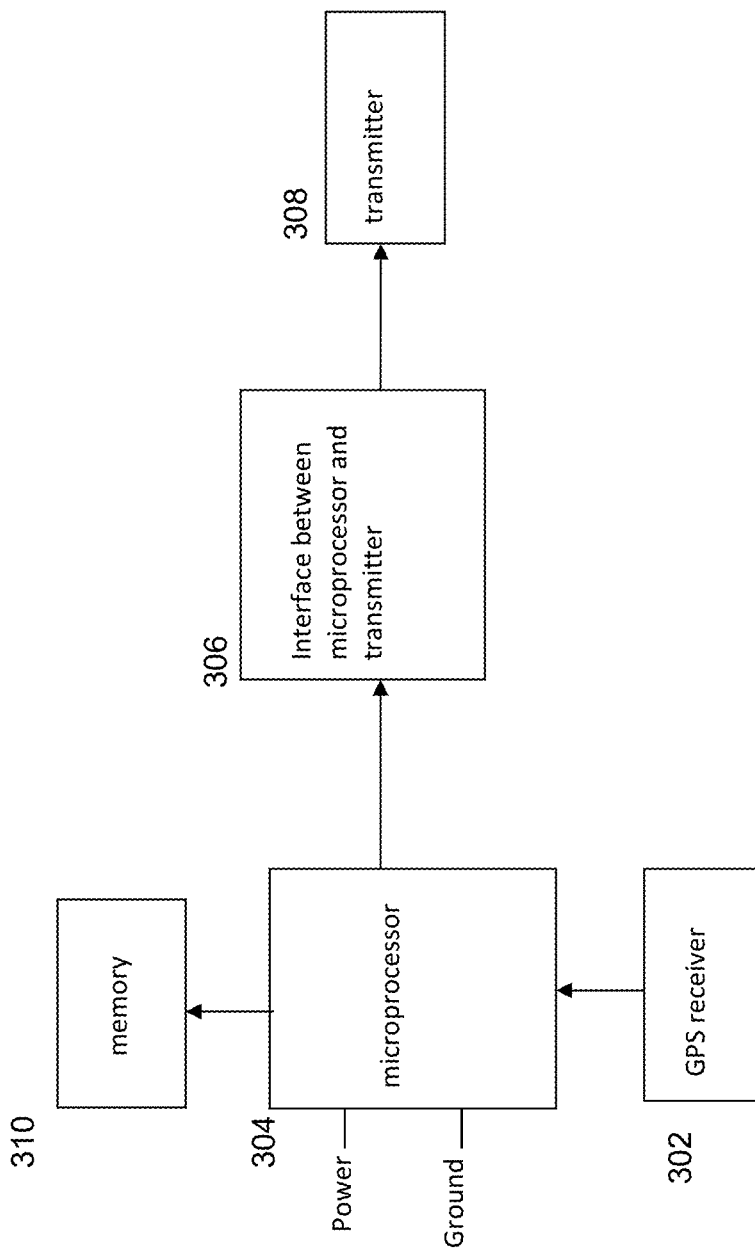
FIG. 3 is a block diagram of an embodiment of buoy electronics.

The electronics enclosure contains the location, processing, and transmission electronics, as shown in FIG. 3. The Global Position System (GPS) or other satellite navigation system receiver (302) communicates location and/or velocity data to the microprocessor or other computer (304). The microprocessor (304) determines what data to send out via transmitter (308). An interface device may be implemented in between the microprocessor (304) and the transmitter (306). The interface is a set of electronics that convert the microprocessor data into the correct format and protocol for the specific transmitter being used. The microprocessor (304) writes data to be stored to internal or external memory (310). The data may include position, speed, acceleration, and heading data, in addition to any additional sensor data or calculated data. The memory also stores parameters to be used in the logic (both default and user-set parameters), such as reporting conditions (e.g., trigger and/or period). The logic instructions implemented by the microprocessor are also stored in the memory, which is a non-transitory computer readable medium. The type of memory may be volatile or non-volatile memory of any type compatible with the microprocessor (304) used on the buoy (206, 210).

GPS is used in one embodiment to determine location of the buoy (206, 210). Any location system may be used, such as GLONASS, inertial, or other state-of-the-art systems, for the location receiver (302). For marine applications, GPS is only available at the surface of the water, not underwater.

Other underwater positioning systems, such as inertial positioning or acoustic positioning, may be used instead of or in conjunction with the GPS system to augment the positioning capability below the surface of the water.

To utilize positioning, an antenna connects with the receiver (302) to determine time, location, acceleration, and/or velocity as long as an adequate number of satellites are viewable from the buoy (206, 210). The antenna is to be mounted in such a way as to be operable in the marine environment, such as being encased in water-tight housings or elements, rated to a certain depth in case the buoy is dragged underwater.

A microprocessor (304) processes the data received from the location system (i.e., from the receiver (302). The microprocessor (304) may be any battery powered processor or computer. In other embodiments, the receiver (302) is used as the microprocessor (304), such as a field programmable gate array of the receiver (302) being used to implement the functions of the microprocessor (304). The microprocessor (304) is enclosed in a water-tight housing for operation in the marine environment. The microprocessor (304) may provide real-time sampling of the GPS data or other data output by the receiver (302). Software executed by the microprocessor (304) causes reading and/or processing of the data. This software can be written in any computer language compatible with the microprocessor (304). Examples are C, C++, Java, Pearl, or any other known computer languages appropriate for this application.

Figure 4:
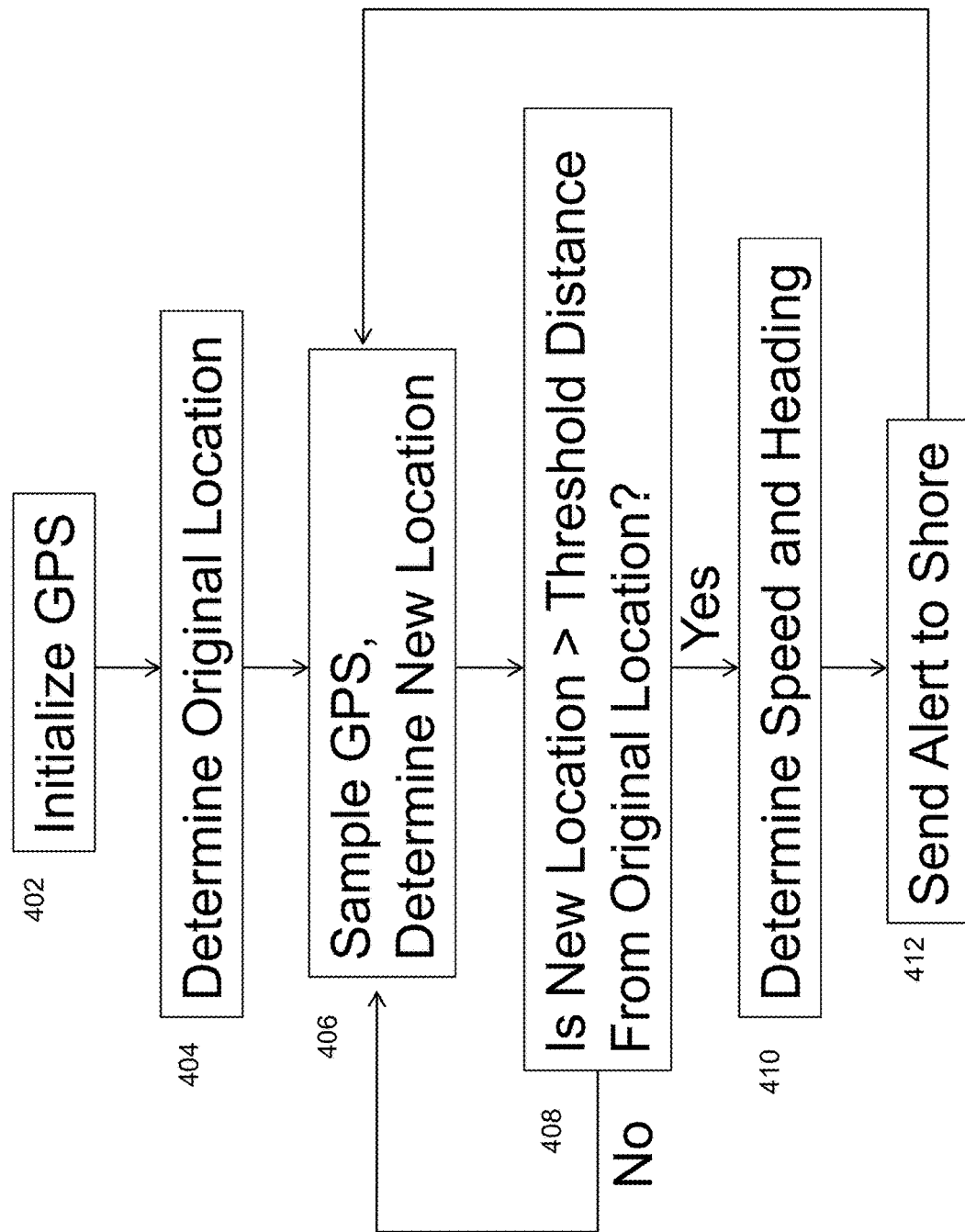
FIG. 4 is a flow chart of one embodiment of a method for detecting derelict gear.

The flowchart in FIG. 4 is an example of an embodiment of a method for generating an alert. The method represents the logic implemented by the microprocessor (304) and/or receiver (302). In other embodiments, one or more acts are performed remote from the buoy, such as by a processor for the graphic user interface with the fisherman.

Additional, different, or fewer acts may be used, such as determining the location without initialization and/or determining speed and heading without distance or vice versa. The acts are performed in the order shown (numerical or top-to-bottom), but other orders may be used.

For GPS, the receiver initializes the position with respect to the satellites in act (402). The microprocessor activates the initialization, or the receiver initializes without control by the microprocessor. In an embodiment, the fisherman depresses a mechanical switch to indicate that the device is being deployed. In response, the microprocessor starts the initialization. In another embodiment, a salt water detection switch activates the initialization upon entry into the water when the buoy is deployed off the boat.

The microprocessor determines, in act (404) and records in the memory an original location of the buoy. The receiver determines the location and communicates the location to the microprocessor. Alternatively, the receiver outputs GPS information from which the microprocessor determines the location.

Periodically, the microprocessor determines a current location. The GPS data from the receiver is sampled or the GPS receiver is triggered to determine the position in act (406). As subsequent sampling of the GPS data indicates the current position of the buoy, the microprocessor compares the current or most recently determined location to the original location in act (408). A distance is calculated. In an embodiment, the fisherman is able to set a threshold value indicating the typical range of motion of a buoy attached to a trap, or some other value desired by the fisherman to use. In another embodiment, a default value is used for the threshold. If the distance between the new location and the original location is within the threshold value, the microprocessor returns to continue monitoring activities. If the new location indicates that the gear has moved beyond the typical range of motion for a buoy attached to a trap (i.e., the distance exceeds the threshold), the speed and heading are determined in act (410), and an alert is sent to the user in act (412).

Further information may be determined. For example and as represented in FIG. 4, the microprocessor calculates the speed and heading from the two more recent locations. Rather than use the original location, the speed and heading are based on the most recently sampled N locations.

Based on exceeding the distance threshold, the alert is generated. The alert may include merely that the buoy has moved beyond the distance threshold. Additional or different information may be included in the alert, such as the distance, current location, the speed, and/or the heading.

The microprocessor sends the alert to the transmitter or otherwise causes the transmit to send the alert to a receiver onshore. The microprocessor may sample the GPS data again or regularly, and an updated alert or alerts with more current information are sent from the transmitter. This pattern continues until the gear is retrieved or a signal is sent by the fisherman to disable alerts.

While this is one embodiment of the logic onboard the buoy, there are other potential embodiments that will accomplish the overall goal of detecting and communicating lost or entangled gear using position and velocity measurements. In another embodiment, an accelerometer is included in the sensors mounted on the buoy, providing acceleration data directly instead of as a calculation. In another embodiment, acceleration could be utilized either separately or in conjunction with other sensor data in determining events involving the buoy motion. As an example, if the buoy experiences an acceleration above a certain normal level, a whale or boat entanglement event could be indicated if other sensor data (e.g., acceleration from an accelerometer, buoy depth from a depth sensor, whale sound from an acoustic sensor, or an image of the surroundings from a camera sensor) from corresponding sensors is correlated with that type of event by a processor. These data can be taken individually, or in combination with one another, to evaluate the occurrence and/or type of event. This event would also trigger an alert to be transmitted. In another embodiment, the combination of position and velocity are used together instead of serially to determine if an event has occurred. In another embodiment, speed and heading are used as a trigger to send an alert independent of the distance traveled. In another embodiment, threshold values are used for velocity, acceleration, or other calculated values to determine whether or not and event has occurred, and of what type. In the embodiments above, the alert is not generated until a trigger event is detected by the microprocessor. The microprocessor determines the type of event using any criteria. In other embodiments, a trigger event occurs. The transmitter transmits information to a receiver. The receiver or an associated processor uses the data in the alert to determine the type of event.

In an embodiment, the position is determined by the GPS receiver (e.g., antenna and electronics) at each sampling time point. In another embodiment, the position is averaged over several time points. The averaging can be a moving average or a fixed-number average. This will reduce the noise on the data and improve the accuracy of the position calculated. In other embodiments, technologies such as Real-Time Kinematic (RTK) techniques are used to improve the positioning accuracy.

In an embodiment, the velocity is determined by dividing two position measurements by the time period between them. In another embodiment, the GPS receiver determines a Doppler velocity. In other embodiments, techniques such as determining the difference of the carrier-phase rate are used to improve the accuracy of the velocity measurement.

The buoy velocity is also sampled and can generate an alert if it is moving faster than normal. Slow movement at a large distance from the original site can indicate wandering of the gear, while gear traveling at higher speeds that are typical of whale motion can indicate a likely whale entanglement. If these scenarios are detected, an alert is sent to the fisherman. This alert facilitates recovery of lost or entangled gear by identifying the likely problem and where immediate retrieval efforts should be focused (i.e., current location or predicted location given current location, velocity, and heading). If the gear is dragged underwater and the buoy cannot receive or transmit data, the microprocessor may will wait until the buoy surfaces again and resume sampling and transmitting. For traps entangled by whales, this would happen when the whale surfaces. For those that have wandered due to inadequate gear setting, the location will be transmitted periodically while the buoy remains on the surface. For traps that have been severed from their buoys, the previously recorded location (e.g., the original location) provides a last-known location for a trap search to be conducted using an acoustic scanner such as a fish finder or sonar.

In an embodiment, a depth sensor is used to determine how deep the buoy has gone. The microprocessor samples signals from the depth sensor and records a deepest depth or the depths. In an embodiment, the microprocessor records the times that the buoy was at the recorded depths. In an embodiment, the microprocessor does not attempt to cause transmission of the alert if the depth sensor indicates the buoy is below the surface of the water. In another embodiment, a salt water sensor can be used to determine if the buoy is below the surface of the water to avoid causing transmission of the alerts.

The depth sensor data over time provides information that can differentiate between whale entanglement or the buoy simply being dragged under by strong currents or tides. If the buoy has been at a depth typical of whales or other marine mammals, typically greater than a few meters, an entanglement event may be indicated. If the buoy has been at a shallow depth, ocean conditions that prevent the buoy from surfacing may be indicated. In an embodiment, this depth and time information is transmitted to shore when the buoy has surfaced again. In an embodiment, the data is used to determine the likelihood of the type of event that has occurred. In another embodiment, the depth and time data are combined with buoy motion data to determine the likelihood of the type of event that has occurred.

In an embodiment, the velocity data from the buoy is compared to local ocean current data for the region to determine the likely magnitude of velocity of the buoy if it was drifting with the current. If the buoy velocity is comparable to the ocean current velocity, then the buoy is more likely to be drifting. If the buoy velocity is different by a threshold value from the ocean current, and also above a threshold that is set to indicate typical whale speed, then the buoy is more likely to be entangled. Heading may additionally or alternatively be used to identify properly deployed gear, drifting gear, and/or entangled gear.

In an embodiment, this data is available to the microprocessor on the buoy and can be incorporated to the logic in determining the statistical likelihood of which event has occurred, to be transmitted to the receiver. As an example, there may be three possible outcomes of a buoy: loss, whale entanglement, or unknown. The sum of all the probabilities of all possible events is equal to 1. If the data on buoy velocity, acceleration, and/or depth combined indicates a certain probability that the buoy has undergone a loss event and is drifting with the current, then that probability will be assigned to that event. The user will be presented with the probabilities of each possible event for a given set of buoy conditions. In another embodiment, the ocean current data is available to the onshore receiver computer and compared to the buoy data. The likelihood of which event has occurred is then determined by an onshore computer and displayed to the user. In an embodiment, the microprocessor will determine the highest likelihood event (for example, gear wandering or marine mammal entanglement) based on the position and velocity parameters. In another embodiment, the receiver computer will determine the highest likelihood event. The likelihood is determined using a look-up table, a machine-learnt classifier, or other assignment of probability given sensor data.

In an embodiment, a strain gauge or other sensor positioned on the line between the buoy and trap is used to determine if the line between the trap and buoy has been severed. If the strain gauge measures a sharp reduction in tension, the line may have been severed. In another embodiment, more than one strain gauge is positioned between the buoy and trap to combine the sensed data and determine if the line has been severed. The strain gauge or other sensor provides signal to the microprocessor. The microprocessor determines if the line has been severed. An alert may be generated in response to detection of a severed line.

In an embodiment, the trap is also instrumented with a passive transceiver or reflector that an acoustic transceiver can use to determine the location of the trap. In an embodiment, the acoustic transceiver is on the buoy. The location of the trap with respect to the buoy can be determined by acoustic transmission from the transceiver and receipt of the reflected or returned acoustic signal. The microprocessor or transceiver determines the distance, direction, and/or location. The location or direction may be found by directional steering of the acoustic transmission. In this embodiment, the trap distance, direction, and/or location is transmitted along with the other buoy data to the receiver. In another embodiment, the acoustic transceiver is on a boat. Using the original location or the last-known location of the buoy when the event occurred as a starting point, the location of the trap can be determined by an acoustic search to facilitate retrieval.

In an embodiment, the trap and/or buoy is given a specific identifier to be transmitted with the data. The identifier is unique relative to other traps and/or buoys used by the fisherman, so that the alert can be associated with that particular trap.

In another embodiment, the position and/or velocity data are sent on a periodic basis to the fisherman so they can confirm whether or not their gear is located where expected. The alert is for the position and/or velocity without having detected that the gear is derelict. This data can also be used to retrieve their gear more accurately when it is time to harvest their traps.

In an embodiment, the threshold values of position, velocity, and/or acceleration or other sensed or calculated values to determine the possible type of event (for example, gear wandering or marine mammal entanglement) are set to default values. In another embodiment, the threshold values of position, velocity, and/or acceleration or other sensed or calculated values for determining the type of possible type of event are set by the fisherman or user.

The transmitter sends the alerts when an event is detected. Alternatively, alerts are sent periodically to update the data about the buoy. In another embodiment, the fisherman can send a request for location or other information to the buoy (i.e., transmitter is part of a transceiver), and the buoy responds with the requested information (e.g., position and velocity data).

In another embodiment, the transmitter and/or microprocessor encodes the data in the alert or the alert so that only the fisherman or trap owner can analyze the data.

The transmitted data contains all or a sub-set of information relevant to the location and retrieval of the traps. The trap identification number, time, location, speed, and heading are may be included in the transmitted message to shore. In another embodiment, the relative location of the trap from an acoustic sensor is transmitted to shore. In another embodiment, data from other sensors mounted on the buoy, such as temperature, salinity, or acidity are included in the transmitted data. In another embodiment, data from the trap, if transmitted to the buoy via an underwater cable connecting the trap to the buoy or via acoustic communications, are included. This could include a count of species in the trap, water temperature at the trap depth, or salinity at the trap depth.

The data is transmitted from the buoy to a receiver of a graphics user interface for the fisherman. The fisherman can be either onshore, or on the boat out on the water. The transmission can be via cellular, satellite, radio, or other communication method. The transmitter and receiver of the graphics user interface are compatible. The microprocessor and/or transmitter formats the data to be sent via the selected method. The user may select between different types of transmission, such as cellular or satellite, between types of encryption, and/or between communication formats.

Figure 5:
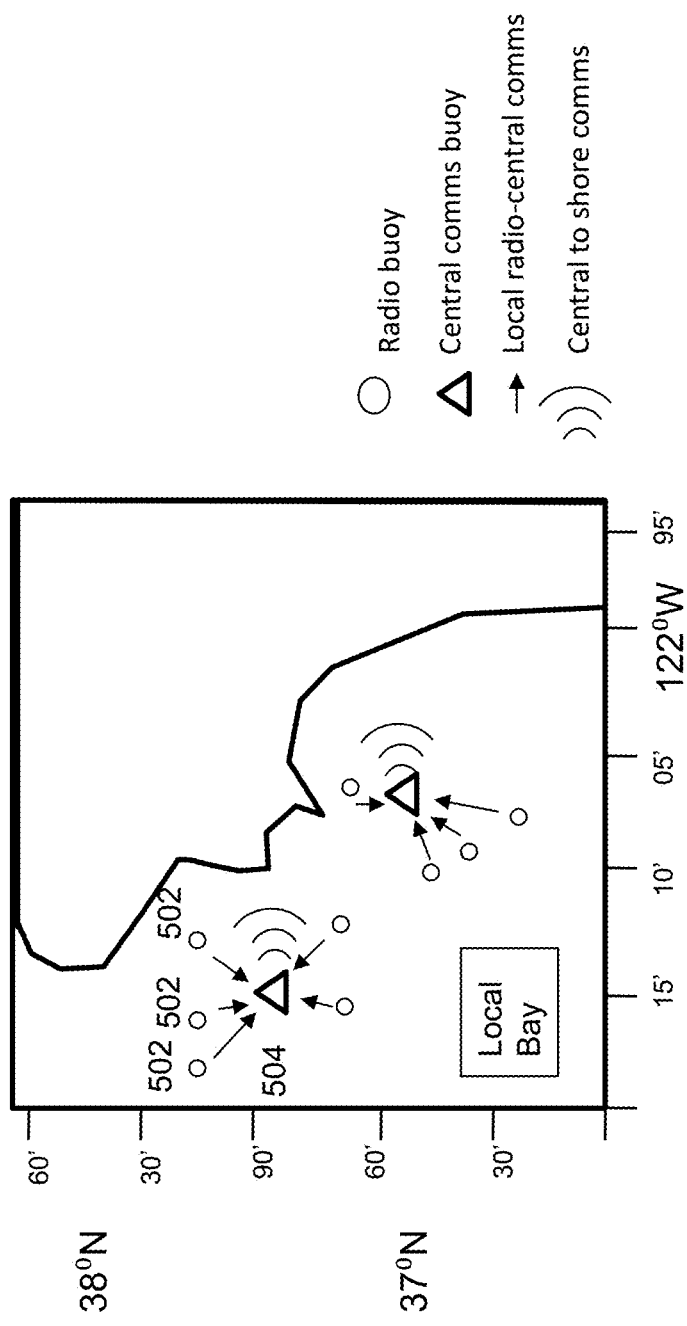
FIG. 5 illustrates networked buoys communicating data to a central buoy, which then transmits the compiled data to shore.

In another embodiment, the buoys are networked to communicate to a central buoy. A mesh network (e.g., all buoys in a set talking to a single main buoy that communicates back to shore) is used. This is shown in FIG. 5. The networked buoys (502) transmit their data to a central buoy (504), which then communicates all the networked buoys' data (alerts) to shore. This allows the network communications to be of a less expensive method, such as long-range radio, while the central buoy can utilize a more expensive method, such as satellite. In another embodiment, the buoys communicate their data in a leap-frog fashion, where each buoy (502) only communicates with the one or ones nearest to it, then each subsequent buoy (502) transmits its own and the prior buoys' (502) data until the main communications buoy (504) is reached. The main communications buoy (504) transmits all the compiled data to shore. In another embodiment, there are several networked sets of buoys (503, 504), depending on the configuration of the fisherman's gear.

In another embodiment, the boat is also equipped with a radio receiver antenna and computer. In the event that a buoy equipped with radio transmission electronics is washed too far away from the other buoys to communicate with them, the last-known location, velocity, and/or heading can be used to determine a starting point by the computer. The boat can then proceed to the starting point and use the boat-mounted radio receiver to listen for the buoy until signal from the buoy is received. The received alert can determine its exact location. The elevated position of the boat antenna increases the distance over which the buoy transmitted data can be received.

The signal transmitted by the buoy is received by a device equipped with an antenna and/or receiver. For example, if the buoy data is transmitted via a satellite signal, a satellite picks up the signal, and transmits the data to an earthbound receiver, which then transmits the data via a computer network, such as transmitting to a computer or processor connected to the Internet. The data is then able to be displayed by a computer, smart phone, tablet, radio, or other device capable of accessing the network. If the buoy data is transmitted via cellular signal, a smart phone or tablet can receive and display the data using the cellular network. If the buoy data is transmitted via radio, the receiver has an antenna for the same wavelength. An interface device may transmit the data from the radio receiver antenna to an associated computer, smart phone, tablet, or other device. The end device for all receivers is capable of displaying a user interface that shows the data.

Figure 6:
FIG. 6 is a block diagram of an embodiment of the land-based receiver.
Figure 7:
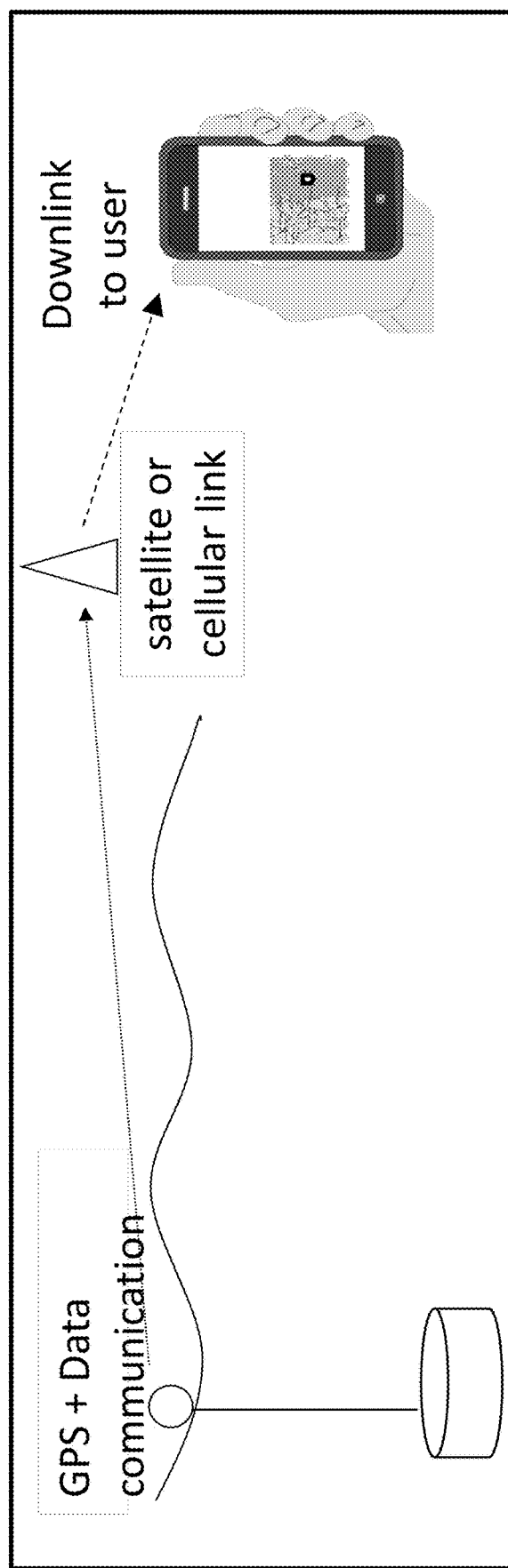
FIG. 7 illustrates communication to a user's smart device with a graphical display.

FIG. 6 shows one embodiment of a remote receiver. The remote receiver (602) is a transceiver, computer, smart phone, tablet, radio, or other device for receiving the alert. An interface device (604) (e.g., satellite, satellite ground station, or cellular network) may be between the receiver (602) and the GUI device (606). The receiver (602) is capable of receiving radio, cellular or satellite data transmission. An antenna of the receiver (602) may directly receive the cellular or satellite transmission. In other embodiments, the receiver (602) is a computer, tablet, smart phone or other processor with an interface for receiving the transmission over a computer network. Any receiver compatible with the transmitted data from the transmitter or from an intermediary device between the transmitter at the buoy and the receiver can be used. The receiver (602) or the interface device (604) transmits the data to the GUI device (606). FIG. 7 shows the GUI-device (606) as a smart phone. In other embodiments, the receiver (602) is part of the GUI device (606).

A processor of the computer, tablet, smart phone, or other device for the GUI device (606) and/or receiver (602) receives information from the buoy, such as sensor data and/or an alert. Where the alert is from the buoy, the processor determines that the buoy is lost or entangled and causes the GUI device (606) (e.g., display) to display a warning. Where the processor receives sensor data, the processor calculates the displacement, velocity, acceleration, and/or other information to determine that the buoy is lost or entangled. A warning is then generated.

The GUI includes one or more input devices, such as a keyboard, mouse, or touch screen, and a display. The GUI is generated by the receiver 602 or a corresponding processor to present information to the user and/or receive user input. For example, the GUI includes the alert or information from an alert as shown on the smart phone in FIG. 7. This software creating and/or operating the GUI can be written in any language, such as C, C++, Pearl, Java, Visual Basic, or any other language appropriate for this purpose.

In an embodiment, the GUI will contain all of the data transmitted, presented on a screen to the user. In another embodiment, the alert signal will be highlighted so as to indicate the urgency of the event to the user. In an embodiment, the alert signal displayed on the GUI will indicate the expected type of event based on the parameters sensed (for example, gear wandering or marine mammal entanglement). In another embodiment, the alert signal displayed on the GUI will indicate the associated probability of the event that has been identified. In another embodiment, the trap identification number, time, location, speed, and/or heading are shown in the GUI. In another embodiment, data from other sensors on the buoy or the trap are included in the GUI. In another embodiment, the data from multiple traps are integrated with a map to provide a visual indication of the location of the gear. Any combination of data received with alerts from one or more buoys are presented on the display.

The remote receiver (602) presents information from the alerts. In other embodiments, the remote receiver (602) processes the information from the alerts and presents derived information. For example, the location and velocity are provided by the transmitter on the buoy. The remote receiver (602) determines the heading, acceleration, type of event, likelihood, and/or other information based on the location and velocity with or without locations and velocities from previous alerts. Alternatively, the alert from the transmitter includes the derived information.

The receiver (602) may be a transceiver. The user input on the remote receiver (602) is used to activate, control, change a setting, or request a function of the microprocessor or electronics on the buoy. The remote receiver (602) transmits a signal to the buoy, and the microprocessor at the buoy responds accordingly.

Figure 8:
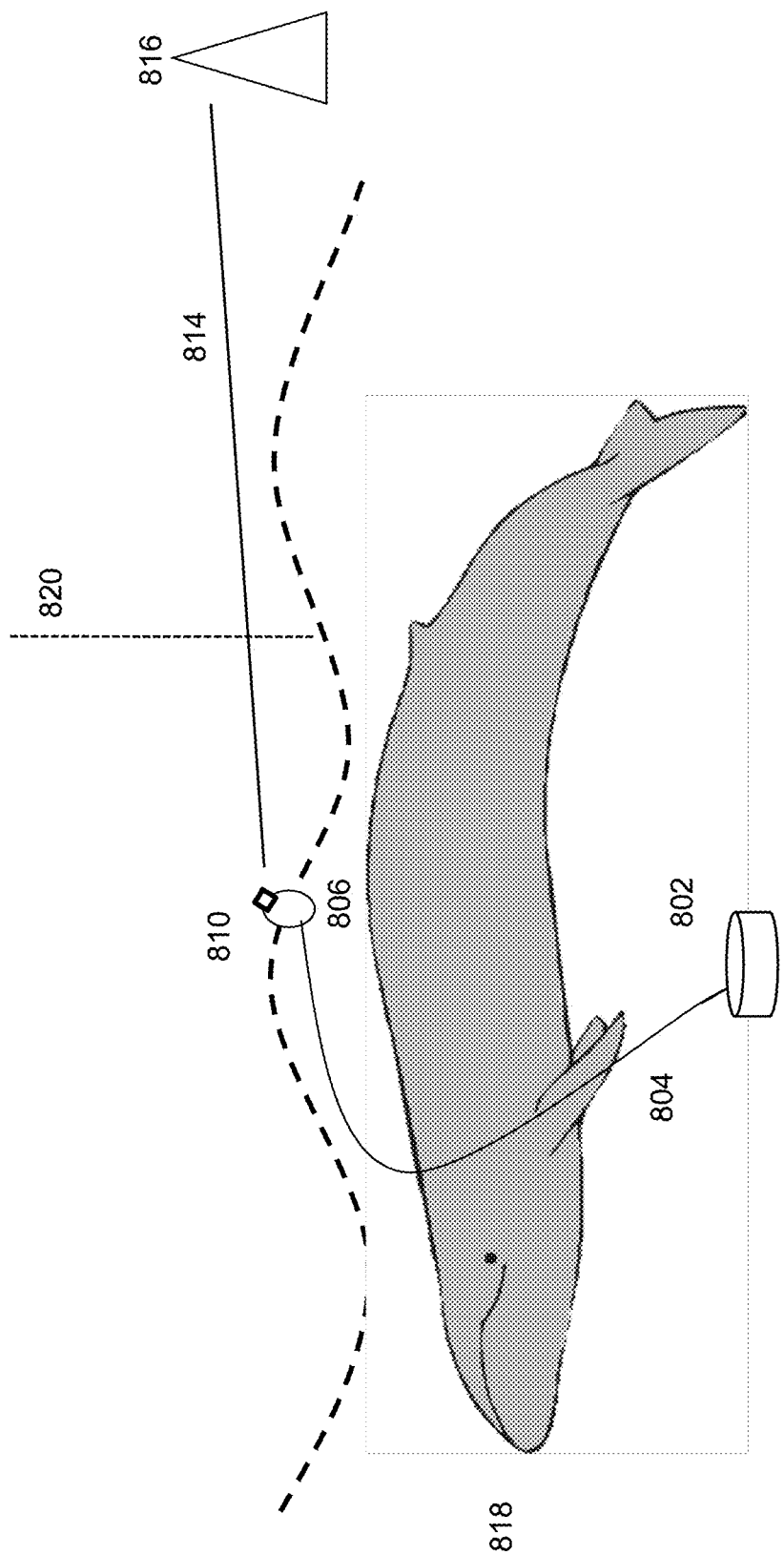
FIG. 8 illustrates of a trap and buoy system that has been entangled by a marine mammal.

FIG. 8 is a representation of an example for how the trap and buoy system can be useful. The whale (818) has become entangled by the trap (802), rope (804), and/or buoy (806), and is dragging the gear away from the original location (820). A transmission signal (814) is sent to the land-based, remote receiver (816). In this example, the whale is moving with the fishing gear away from the original location at a relatively high speed. The buoy microprocessor detects the position and velocity, and determine that an alert needs to be sent to the fisherman. The fisherman may react upon occurrence of the event rather than merely finding the gear missing when attempting to retrieve the trap (802) at a later time.

Figure 9:
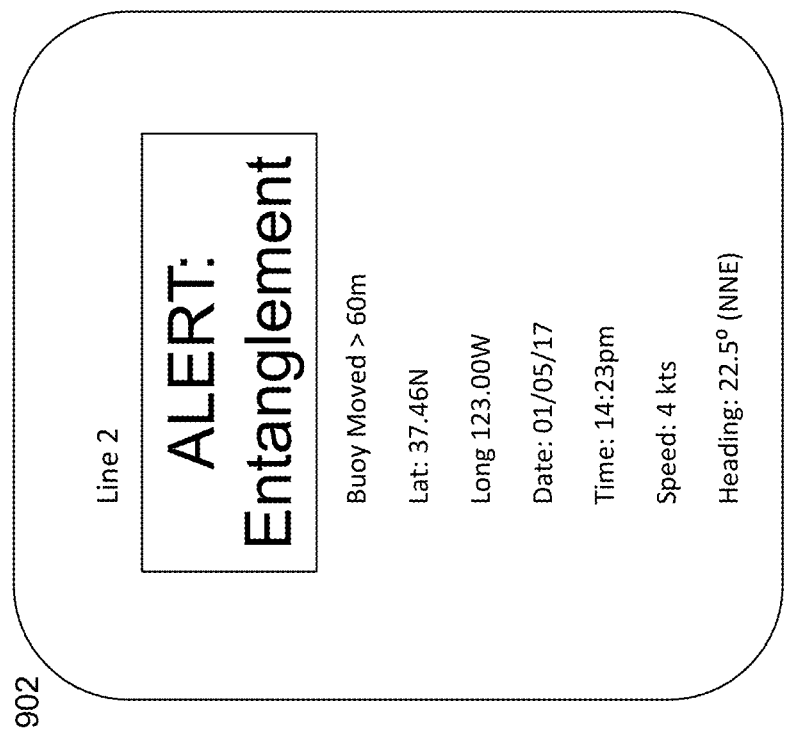
FIG. 9 illustrates an embodiment of a graphical user interface showing an alert where the buoy is moving away from an original location at a high speed.

FIG. 9 is a representation of a display of the GUI that would be received in the example of FIG. 8. In this embodiment, the identification number of the buoy is listed, along with the position, speed, and heading information relevant to the last-known data received. The type of event is listed as "entanglement." The type of event or other information may be highlighted with color, flashing, or other emphasis. Additional, different, or less information may be provided. The display is updated as additional data becomes available, periodically, and/or in response to the fisherman requesting an update on the GUI.

Figure 10:
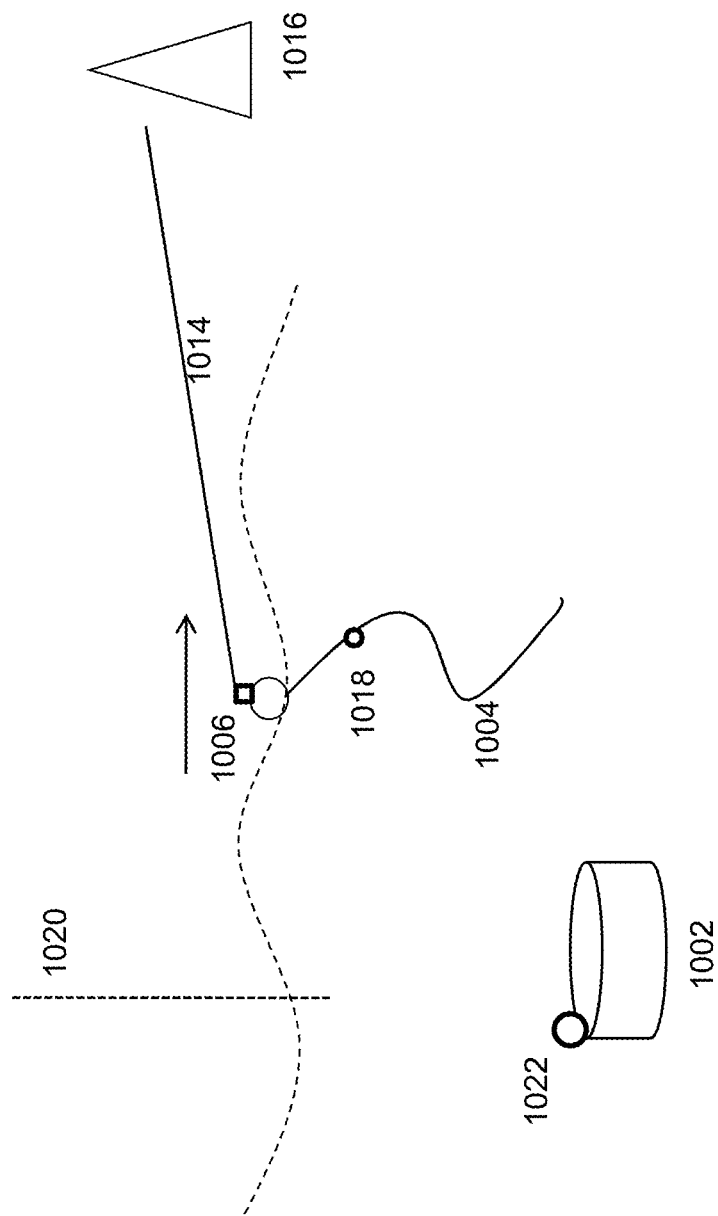
FIG. 10 illustrates a trap and buoy system where a line has been cut and the buoy is floating away from an original location.

FIG. 10 is a representation of a second example of how the trap and buoy system can be useful. In this example, the line (1004) between the trap (1002) and buoy (1006, 1010) has been severed and the buoy is floating away from its original location (1020). A sensor (1018) detects the line being severed. Alternatively, a change in position above a threshold and the velocity are used. A transmission signal (1014) is being sent to the land-based receiver (1016) in response. In this example, the buoy is drifting slowly away from the original location. The buoy microprocessor detects the position, change in position, line sensor indication of severing, and/or velocity and determines that an alert needs to be sent to the fisherman. A passive acoustic reflector (1022) on the trap facilitates retrieval by indicating the location of the trap relative to the acoustic transceiver used to find the trap at the location recorded by and sent to the remote receiver.

Figure 11:
FIG. 11 illustrates an embodiment of a graphical user interface showing an alert where the buoy is moving away from an original location at a low speed.

FIG. 11 is a representation of a display of the GUI that would be received in the example of FIG. 10. In this embodiment, the identification number of the buoy is listed, along with the position, speed, and heading information relevant to the last-known data received. The type of event is listed as "gear separated." The type of event or other information may be highlighted with color, flashing, or other emphasis. Additional, different, or less information may be provided. The display would be updated as additional data becomes available, periodically, and/or in response to the fisherman requesting an update on the GUI.

Figure 12:
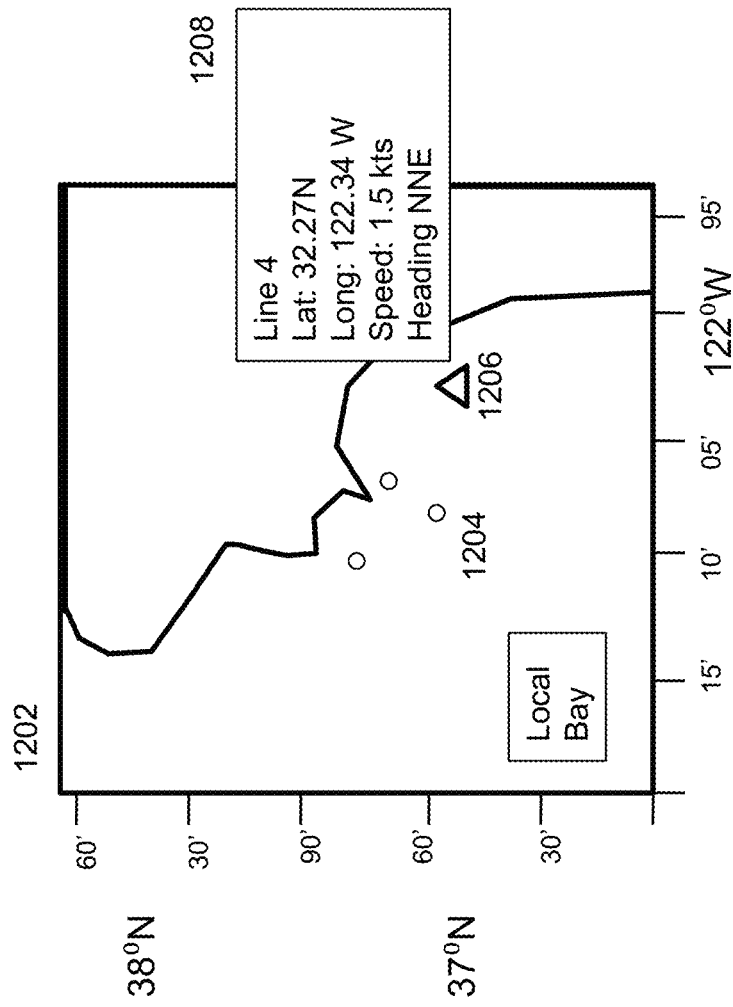
FIG. 12 illustrates an embodiment of a graphical user interface with integration of a map.

FIG. 12 represents another embodiment of a display of the GUI (1202) where the data from multiple trap and buoy systems is integrated with a mapping application for a smart-phone or other display computer. In this embodiment, the circles (1204) indicate buoys that are located close to their original sites. The triangle (1206) in this example represents a location of a buoy that has moved beyond the threshold value from its original site. In an embodiment, the user can interact with the screen on the GUI to pop up a display (1208) of the current position and/or other data (e.g., velocity or type of event) for a desired buoy. In an embodiment, the user can click on a particular buoy to show its location and any relevant sensor data. In another embodiment, the radius of typical buoy motion from its deployed location can be shown. In another embodiment, the initial location of a buoy can be displayed.

The data from the instrumented buoys that are being used by the fisherman can be recorded over time by the remote receiver or another computer. In another embodiment, the data are recorded by the microprocessor on the buoy and downloaded upon retrieval. Any of the location, velocity, acceleration, or other data is recorded. This data can be graphed over either short periods of time (such as during a single deployment, on the order of days), long periods of time (such as over an entire season, on the order of months), or from season to season. Any data received may be plotted, including speed, heading, number of lost or entangled, ratio of lost or entangled, or other sensor data that has been included in the transmission from the buoy. The trend or plot analysis may be for a specific region, entire region covering all buoys, specific buoys, or all buoys. The plot can help determine trends such as locations of high gear loss, separated gear, or entanglement. Any plotting may be used, such as Matlab, Excel, Mathematica, or any application software specific to a user device such as an iPhone, iPad, or Droid device. The plot display may be a mapping application to display the data spatially or spatially and temporally. Analysis of the data by a processor may generate a plot, trend, statistic, or other numerical representation from the recorded data. The data may be represented graphically as "hot spots" indicating areas of higher or lower occurrence of entanglement or loss events. The locations or regions of entanglement of a previous season or seasons based on the plot may be avoided or have fewer traps placed there, avoiding future entanglement or loss. The trends may be used similarly for planning future placement.

Figure 13:
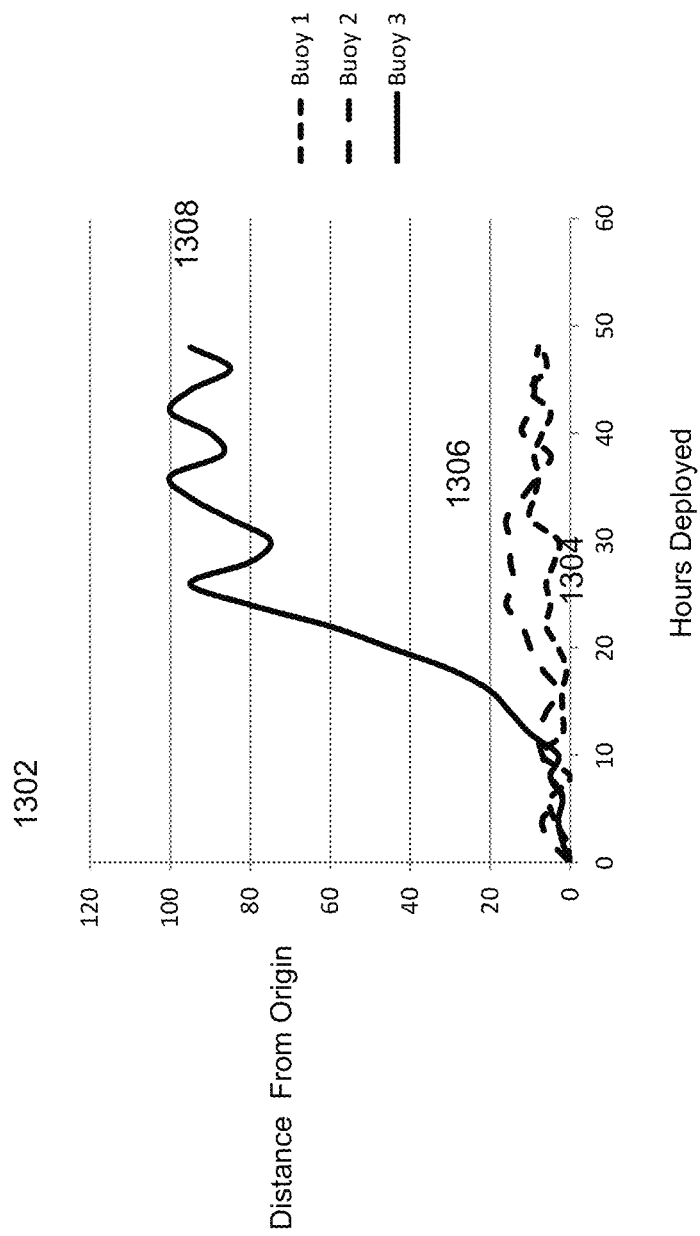
FIG. 13 illustrates an example of a plot generated of distance by buoy over time.

FIG. 13 is a representative short-time-period graph (1302) of example data from a single deployment for multiple buoys. In this example, the data for Buoys #1 and #2 (1304 and 1306) shows they have remained relatively close to their original location, while data for Buoy 3 (1308) indicates it has moved beyond the threshold value from its original location until its retrieval. The graph (1302) can help provide data on how buoy motion varies based on currents or marine mammal motion when entangled. The data can also be used in conjunction with retrieval efforts to indicate how far gear wanders in currents.

Figure 14:
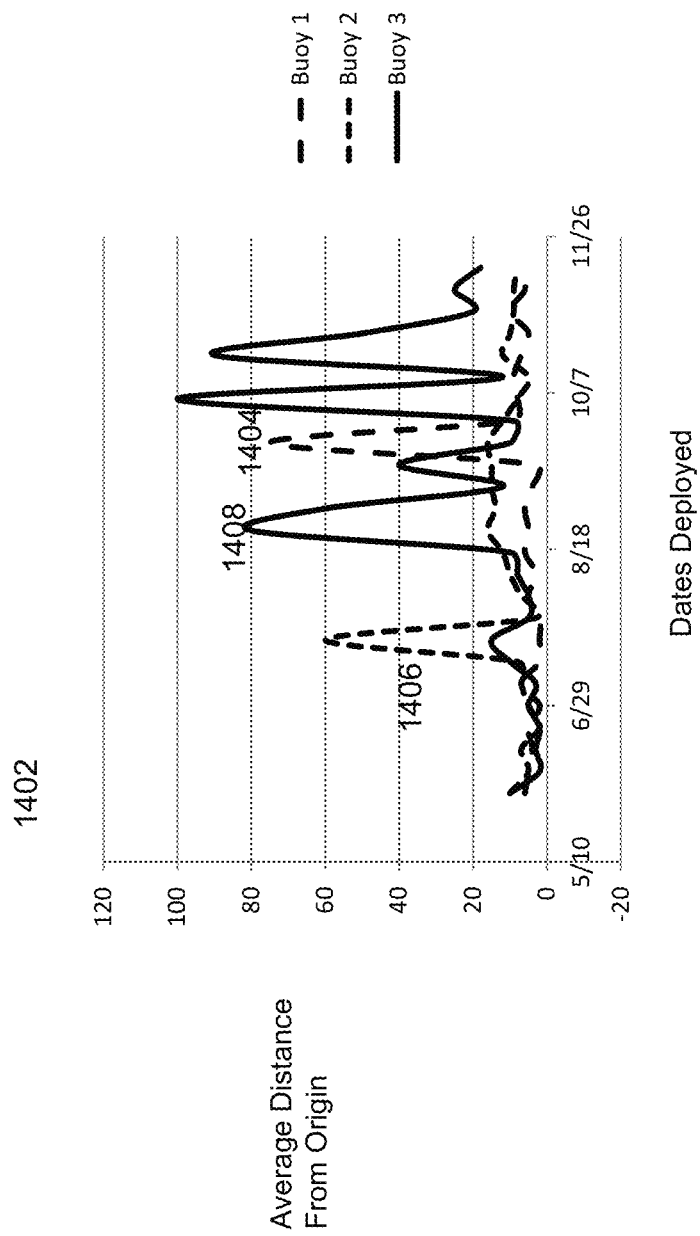
FIG. 14 illustrates another example of a plot generated of average distance by buoy over time.

FIG. 14 is a representative long-time-period graph (1402) of example data from multiple buoys over a period of months. In this example, the average distance from original location for each buoy is graphed. The time points where the data shows that the buoys moved further than the defined thresholds (1404, 1406, 1408) can be picked out visually for each one. This can indicate how often loss/entanglement events are occurring, and for which locations.

Figure 15:
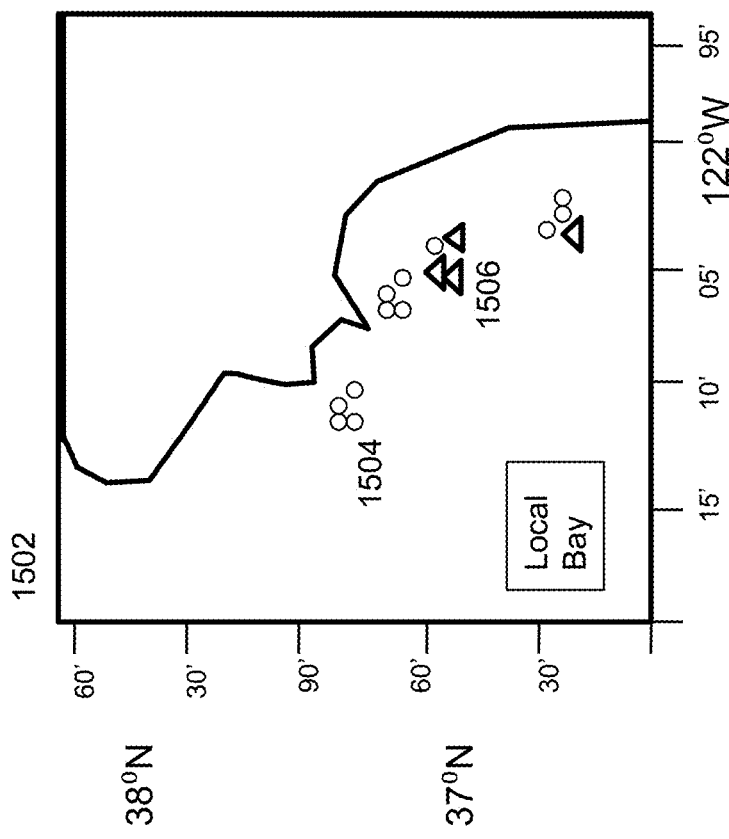
FIG. 15 illustrates an example map showing derelict gear location.

Other information may be manually or automatically derived, such as plotting a graph showing locations regardless of which buoy are associated with greater loss over seasons. FIG. 15 is a representative long-time-period graph (1502) of example data from multiple buoys over a period of 4 deployments, plotted on a map. The latitude and longitude of the initial buoy deployments are indicated by the circles on the map. The circles (1504) indicate deployments where the buoy did not move significantly from its original location, while the triangles (1506) indicate deployments where the buoy moved away, beyond the threshold value, indicating a loss or entanglement event. This example display can help indicate which locations have a higher instance of loss or entanglements. This information may be used to calculate by the remote receiver a likelihood of loss for any given location. This could be used to help inform where traps should or should not be set in the future.

In another embodiment, the latitude and longitude data of a particular buoy is plotted for each deployment over a season, showing the motion for each one. This could also be done on a map background for relative location information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is the following:

1. A system for detecting lost or entangled fishing gear, the system comprising:
   a buoy for attaching to fishing gear;
   a sensor of the buoy;
   a detector configured to differentiate, based on output of the sensor of the buoy, between the buoy becoming lost by ocean conditions or the buoy becoming entangled with marine life; and
   a transmitter configured to send the output or to send an alert indicating that the buoy has become lost or entangled based on the differentiation.

2. The system of claim 1 wherein the sensor comprises a GPS sensor and/or accelerometer configured to sense location, motion, velocity, and/or acceleration of the buoy.

3. The system of claim 1 wherein the sensor is configured to sense motion of the buoy, wherein the motion includes a location and a velocity of the buoy.

4. The system of claim 1 wherein the detector is configured to determine that the buoy is lost or entangled from a distance of a current location from an initial deployed location or a previous location.

5. The system of claim 1 wherein the sensor output includes an acceleration of the buoy.

6. The system of claim 1 wherein the sensor output includes a depth of the buoy.

7. The system of claim 1 wherein the alert indicates a location or motion of the buoy.

8. The system of claim 1 further comprising a trap connectable with the buoy, wherein the trap includes an additional sensor operable to detect a location of the trap.

9. The system of claim 1 wherein the detector is configured to check, at a pre-set periodicity, for when the buoy has moved based on the output.

10. The system of claim 1 wherein the detector is configured to cause the transmitter to transmit the output and/or the alert in response to a user request.

11. The system of claim 1 wherein the transmitter is configured to transmit via satellite communications system.

12. The system of claim 1 wherein the transmitter is configured to transmit as a radio frequency or cellular signal.

13. The system of claim 1 wherein the transmitter is configured to transmit to another buoy, and wherein the other buoy is configured to transmit information compiled from the buoy, the other buoy, and additional buoys.

14. The system of claim 1 further comprising:
   a trap connectable with the buoy;
   a transceiver or reflector on the trap, the transceiver or reflector responsive to signals from the buoy.

15. The system of claim 1 further comprising:
   a graphics user interface (GUI) configured to display the alert.

16. The system of claim 15 wherein the GUI is configured to display the alert in a text format.

17. The system of claim 15 wherein the GUI is configured to display a map with a location of the buoy.

18. The system of claim 15 wherein the GUI is on a smart phone.

19. The system of claim 15 further comprising a memory configured to save the data contained in the alert.

20. A system for detecting lost or entangled fishing gear, the system comprising:
   a receiver configured to receive sensor data or an alert from a buoy configured to attach to and originally attached to fishing gear, the sensor data or the alert based on depth information of the buoy and velocity of far the buoy, the depth information comprising depth data over time;
   a processor configured to determine that the buoy is lost or entangled from a combination of the depth data over time and the velocity; and
   a display configured to display a warning based on the determination of the buoy being lost or entangled.

21. The system of claim 20 wherein the sensor data further comprises sensor data from a position sensor, an accelerometer, and/or a velocity sensor.

22. The system of claim 20 wherein the receiver is configured to receive the sensor data, and the processor is configured to determine a displacement, and/or acceleration from the sensor data as part of the determination.

23. The system of claim 20 wherein the receiver is configured to receive the alert, the alert being based on displacement, and/or acceleration of the buoy, and wherein the processor is configured to determine that the buoy is lost or entangled due to having received the alert.

24. The system of claim 20 wherein the processor is configured to calculate relative probabilities of cause of lost or entangled.

25. The system of claim 20 wherein the receiver, processor, and display comprise a computer, tablet, or smart phone.

* * * * *